April 17, 1962 M. J. DIAMOND ETAL 3,029,943
ELECTRONIC FLAW DETECTOR
Filed Sept. 9, 1955 3 Sheets-Sheet 2

Inventors
Milton J. Diamond,
Norman W. Schubring &
Edward F. Weller, Jr.
By R. E. Fowler
Attorney April 17, 1962
M. J. DIAMOND ETAL
3,029,943
ELECTRONIC FLAW DETECTOR
Filed Sept. 9, 1955
3 Sheets-Sheet 3
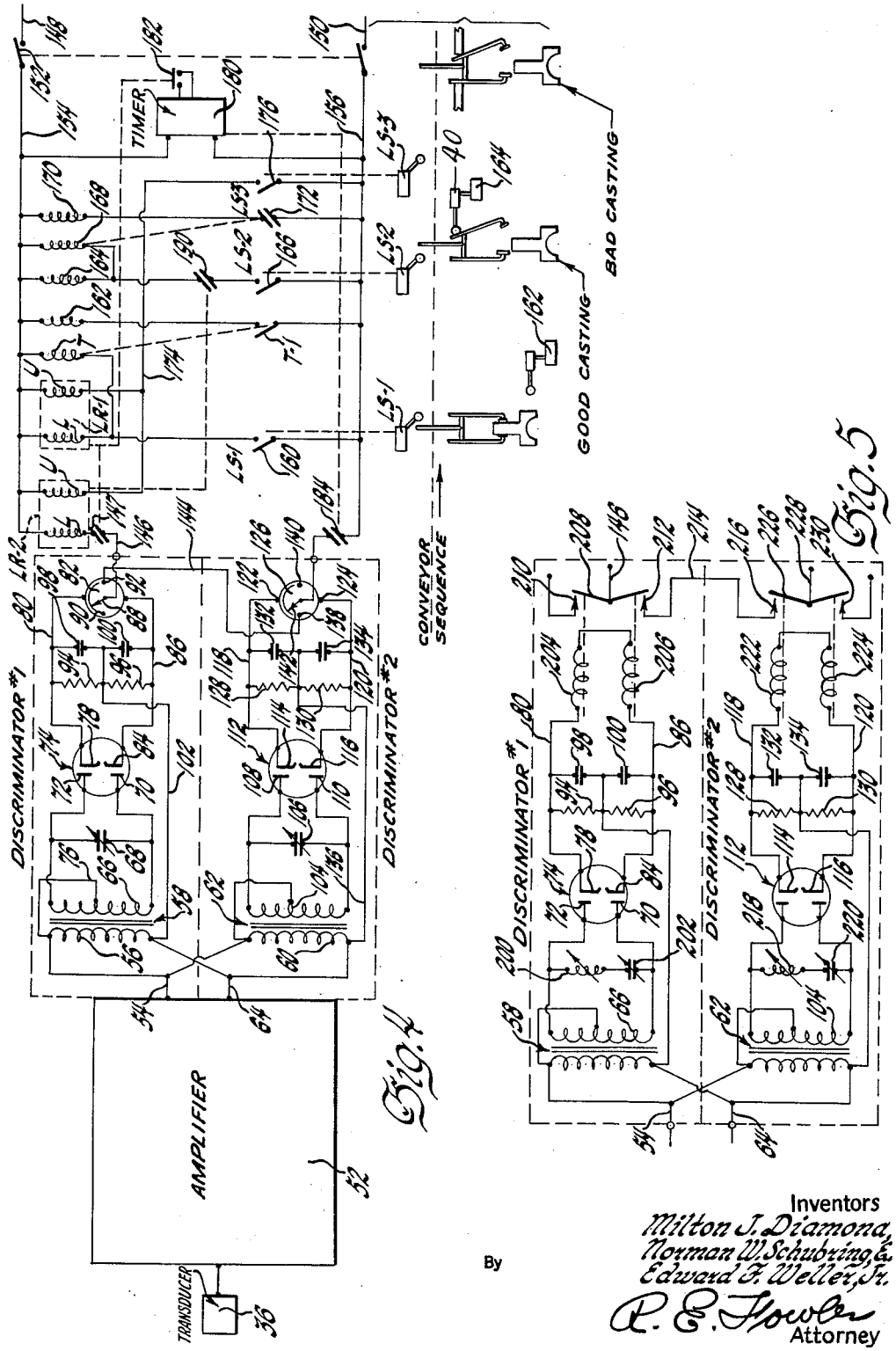
Inventors
*Milton J. Diamond,*
*Norman W. Schubring &*
*Edward F. Weller, Jr.*
By
*P. E. Fowler*
Attorney

United States Patent Office 3,029,943
Patented Apr. 17, 1962

3,029,943
ELECTRONIC FLAW DETECTOR
Milton J. Diamond, Saginaw, Norman W. Schubring, Hazel Park, and Edward F. Weller, Jr., Detroit, Mich., assignors to General Motors Corporation, Detroit, Mich., a corporation of Delaware
Filed Sept. 9, 1955, Ser. No. 533,482
7 Claims. (Cl. 209—111.5)

This invention relates to testing means and more particularly to a resonant means for testing production parts for soundness or flaws.

Prior to utilizing parts in production assembly operations it is necessary to test them to ascertain whether they have any occlusions, flaws or cracks which will make them unfit for use or which may at some later time cause failure of the machine into which they are to be assembled, necessitating expensive repairs. Parts formed of metal and some other substances, even though they are of irregular shape, have a natural period of resonance and can be made to resonate if they are freely supported and struck a blow. Once a part has been designed and fabricated, the natural frequency thereof can be determined. Any flaw, occlusion or crack in the part, even if invisible to the eye, will vary the resonant frequency of the part and, therefore, this characteristic may be used for the testing and sorting of parts of a given configuration prior to use.

It is therefore an object in making this invention to provide a means for testing and sorting a plurality of parts of the same configuration for sound and unsound characteristics.

It is a still further object in making this invention to provide testing means for sorting satisfactory from unsatisfactory parts by a resonant method.

It is a still further object in making this invention to provide automatic apparatus operating on resonance of the part for sorting satisfactory from unsatisfactory parts to be used in production.

With these and other objects in view which will become apparent as the specification proceeds, our invention will be best understood by reference to the following specification and claims and the illustrations in the accompanying drawings, in which:

FIGURE 4 is a circuit diagram of the electrical control system utilized with the automatic testing machine for sorting production parts; and FIGURE 5 is a circuit diagram showing a modified form of the discriminator section of the electrical control system.

Figure 1:
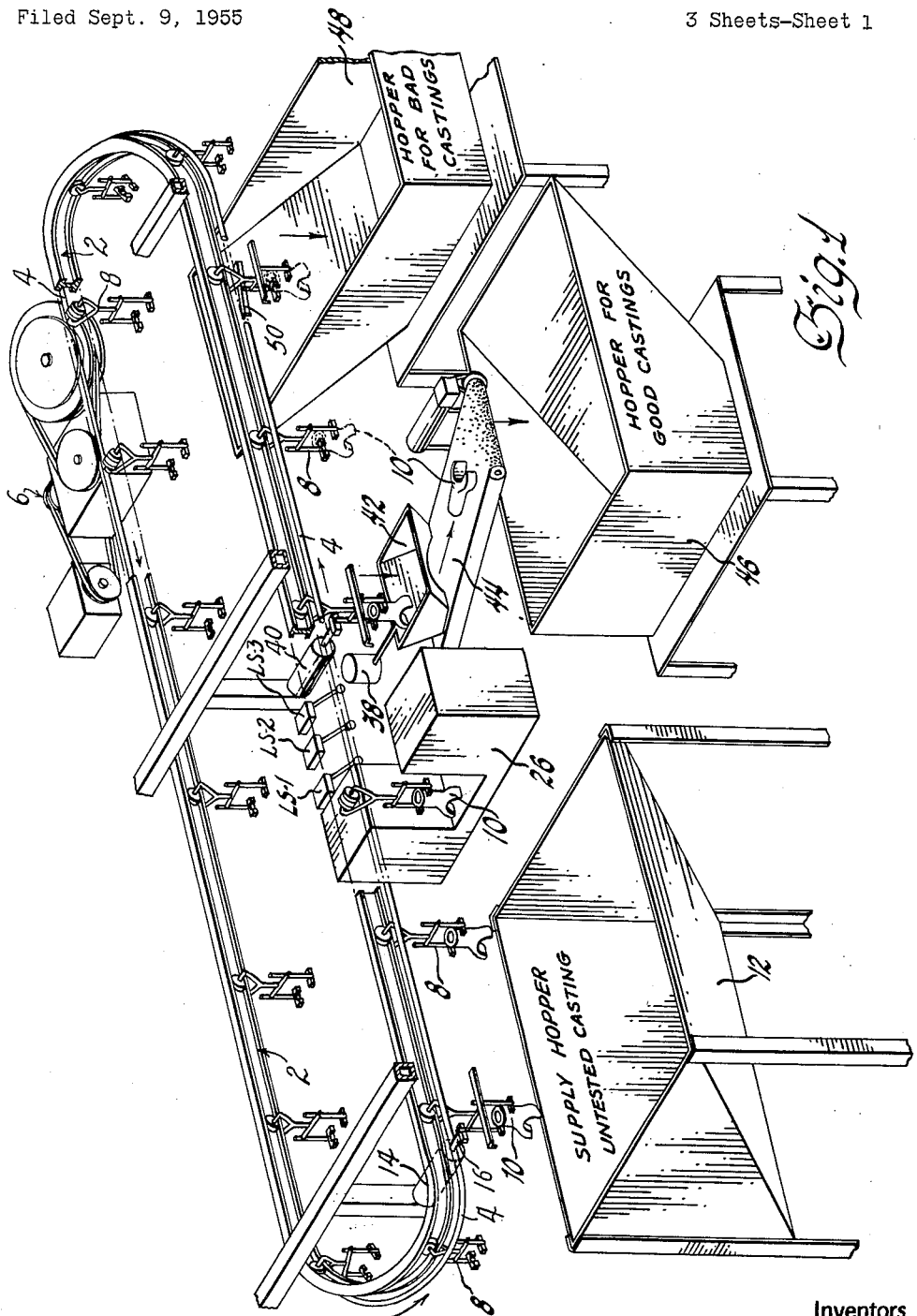
FIGURE 1 is a diagrammatic showing of an automatic machine for sorting satisfactory from unsatisfactory parts utilizing our invention.

Referring now more particularly to FIGURE 1, there is shown therein a diagrammatic automatic system for testing machine parts. In general the parts to be tested are hung on a traveling conveyor support which per se forms no part of the present invention and moved to a first test position, at which point they are struck a blow to set them into resonance. At this point also there is located microphonic means for picking up the vibrations of the part which are transformed into electrical oscillations and applied to an amplifying and control system. If the part is satisfactory and resonates within a predetermined range, it is sprayed with a small identifying dot, indicating that it has been tested and found satisfactory, released from the traveling conveyor system, and dropped into a bin. If the part is not satisfactory, it is not released, but continues on to a later station, where it is mechanically released by a cam surface and dropped into a bin for unsatisfactory castings.

Figure 3:
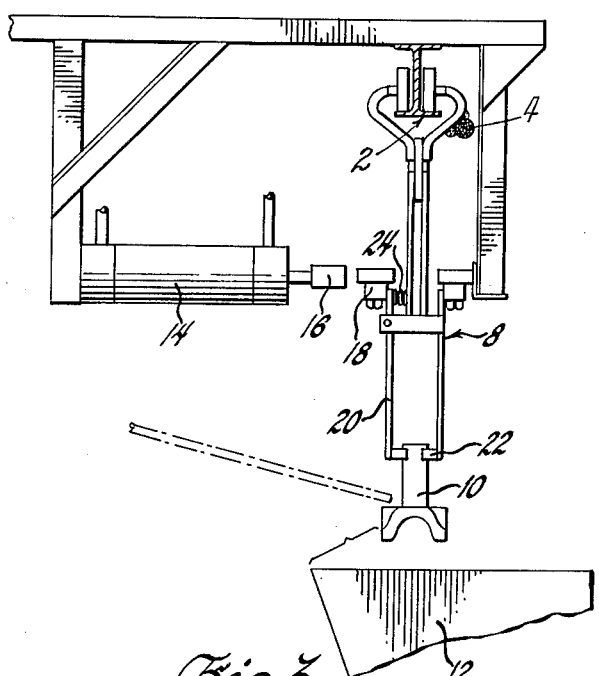
FIGURE 3 is a further sectional view through the conveyor system at the loading station.

Referring now more particularly to FIGURE 1, there is shown therein an endless track 2 consisting of an I-beam which supports a series of spaced traveling arm supports 8 all connected to an endless movable conveyor belt 4 driven by a suitable driving mechanism identified generally at 6, the assembly of belt 4 and the various arm supports 8 when driven therefore continues to circulate around the track 2. This belt 4 is secured to each of the spaced series of traveling supports 8 which individually carry the parts 10 to be tested. As one of the traveling supports 8 reaches the position over hopper 12 in which the untested castings are stored, a part 10 is manually taken from the hopper and applied to the traveling support or carriage 8 while the jaws or arms are open. This is accomplished by the operator closing a switch, not shown, to energize an air cylinder 14. This is best shown in FIGURE 3. The air cylinder 14 has a plunger 16 which is forced outwardly into engagement with a member 18 on the traveling support 8. This pressure causes one of the gripping arms 20 to rotate around its pivot, separating the jaws 20—22 so that the part to be tested may be inserted therebetween. Release of the switch energizing the air cylinder 14 will cause its plunger 16 to return to its normal position and biasing spring 24 may then close the jaws 20—22 to grip the part 10 for transport.

Figure 2:
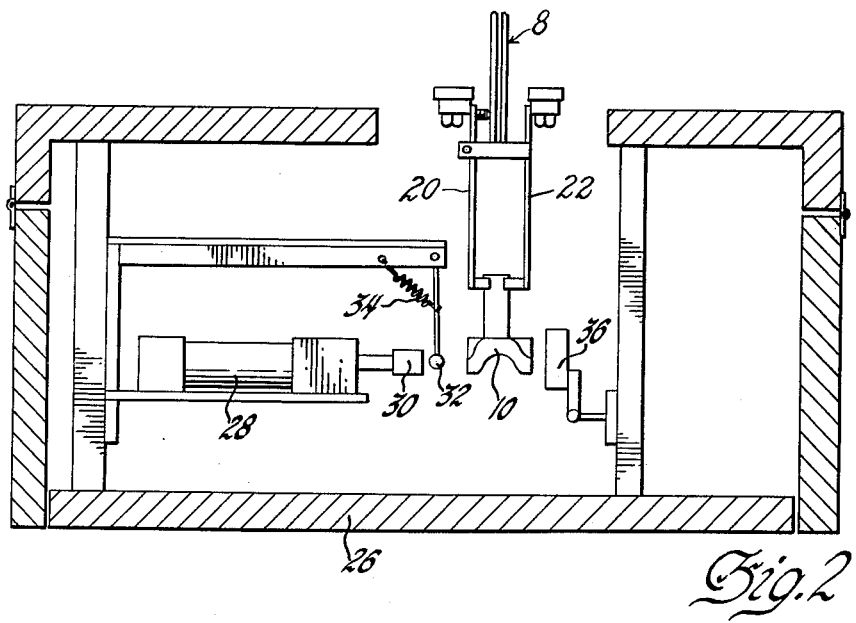
FIGURE 2 is an enlarged sectional view taken through the conveyor system at the point of striking the part for testing purposes.

The part is then moved along in the direction of the arrows on the track until it reaches a position within the box-like structure 26. This is best shown in FIGURE 2. At that point it is struck a blow by a striking solenoid 28, whose plunger 30 forces a pivoted striker 32 against one of the parts 10, which is in alignment therewith. The striker 32 is spring biased in the opposite direction by spring 34. At this station on the side opposite the striker there is mounted a pickup microphone 36 or transducer for picking up the vibratory waves produced by the resonance of the part and converting them to electrical oscillations. Mounted along the track in this area are three mechanically operated limit switches whose function will be later described. These are LS-1, LS-2, and LS-3. They are mechanically engaged by the passage of the part and actuate certain controls. At the next station if the part is satisfactory, a paint spray 38 is energized to apply a small dot of color to the casting, indicating that it is good. Also at this location there is a second air cylinder 40 which is energized by the control circuit to again open the jaws 20—22 of any one of the traveling carriages 8 and release the part carried thereby at this point if it is satisfactory. It falls into a small hopper 42 and thence through the bottom thereof to a conveyor belt 44 which carries it out to drop into a large hopper 46 for good castings.

If the part does not resonate within the prescribed range of frequencies for good castings, it continues on along the track until it reaches a point over the hopper 48 which is for poor or unsatisfactory castings. At that point the pivoted arm 20 of the gripping portion of the carriage 8 rides against a wedge-shaped cam section 50 to mechanically move the jaw 20 separating the two apart and drop the part into the hopper 48. Thus an operator may sequentially apply parts to the traveling carriages 8 and have them automatically tested and dropped into the selected bin or hopper at the other side.

Referring now more particularly to FIGURE 4, there is shown therein the electrical control circuit for operating the various means previously described in general. In that figure there is shown at 36 the microphone or transducer which picks up the resonant vibrations of the part.

This microphone is connected into a limiting amplifier means 52 which is shown in block diagram and which amplifies the output of the microphone and is stable. The output of the amplifier is connected to a discriminator section which provides voltages dependent upon frequencies. One amplifier output line 54 is connected to one terminal of the primary 56 of one input transformer 58 and also to one terminal of a primary winding 60 of a second input transformer 62. The other output line 64 from the amplifier section 52 is likewise connected to the opposite terminals of both primary coils 56 and 60. Thus the output of the amplifier is applied directly across both transformer primaries. The secondary 66 of the transformer 58 is connected across a variable condenser 68 and to two anodes 70 and 72 of a full wave rectifier 74. A tie line 76 connects one terminal of the primary 56 with the center tap on the secondary 66. One cathode 78 of the tube 74 is connected to line 80 which extends to one terminal of a contact type meter 82. A second cathode 84 of the tube 74 is in like manner connected through line 86 to the opposite terminal of the contact type meter 82.

This meter includes a pivotally movable arm 88 whose position is adjusted by the direction and amount of current flowing, to engage two stationary contacts 90 or 92 for switching purposes. Resistances 94 and 96 are connected in series across the lines 80 and 86. Condensers 98 and 100 are in like manner connected in series relations across lines 80 and 86. Common intermediate connections between condensers 98 and 100 and resistors 94 and 96 are connected through conductor 102 with one terminal of the primary 56. This is a normal discriminator circuit and when tuned to a given center frequency will have zero output across lines 80 and 86 when that frequency is applied thereto, which output will increase in a positive direction upon an increase in frequency from that point or will increase in a negative direction upon a reduction in frequency from that point.

The second discriminator section is the same as the first and includes a secondary transformer winding 104 which is directly connected across a variable condenser 106 for tuning the same and thence to two anodes 108 and 110 in a full wave rectifier 112. The cathodes 114 and 116 of this tube are connected through lines 118 and 120 to the two terminals 122 and 124 of a second contact type meter 126. A pair of resistances 128 and 130 are connected across lines 118 and 120 in series and a pair of condensers 132 and 134 are likewise connected in series across these two lines. Intermediate points between the two condensers 132 and 134 and between the resistances 128 and 130 are commonly connected through conductor 136 back to the primary winding 60 of the transformer 62. The contact meter 126 is provided with two stationary switch contacts 138 and 140 which are adapted to be engaged by a pivotally movable arm 142 of the meter as it is affected by the current flow and its direction. A conductive line 144 extends between stationary contact 92 of meter 82 and stationary contact 138 of meter 126. Stationary contacts 90 and 140 of these two meters are unconnected.

The upper discriminator system, identified as discriminator #1, is tuned to a resonant center frequency at the low end of the range, which would be satisfactory for the part to be tested. On the other hand, discriminator #2 is tuned to the upper end of the range, which would be satisfactory for the part. Anywhere within these two limits it is desired to provide circuit connections for energizing the air cylinder 40 so that the part being tested will be released over the hopper 42. The movable member 88 of the meter 82 is connected through line 146 to a pair of contacts 147 actuated by the relay coil LR-1 as indicated by the dotted line. The opposite terminal of the contacts 147 is connected through the locking or operating coil L of a relay LR-2. Main power supply lines 148 and 150 may be connected to any suitable source of power, such as for example, the conventional 110 volt line. A main switch 152 is provided to deenergize the system and disconnect it from the main lines. This switch is connected to supply lines 154 and 156 in the control circuit. Line 154 is directly connected to the opposite side of the coil L of relay LR-2. It is also connected to one side of unlocking coil U of the same relay LR-2, to one terminal of the locking coil L of the locking relay LR-1, and to one side of the unlocking coil U of that relay.

The opposite terminal of the locking coil L of locking relay LR-1 is connected through mechanically actuated limit switch 160 to line 156. This switch 160 is a mechanically operated switch which is actuated by mechanism LS-1 mounted beside the track, which is operated by the passage of one of the parts conveyors 8 past a certain point in the system. A relay coil T is also connected between line 154 and limit switch 160, and is energized when switch 160 is closed. The relay coil 162 is directly connected across lines 154 and 156 in series with switch T-1 actuated by relay T. This switch when closed completes an energizing circuit for relay coil 162. This coil actuates the striking solenoid 28 to cause the part to ring for test purposes. A further relay coil 164 which controls the air cylinder 40 is connected across lines 154 and 156 in series with switch 190 and switch 166, switch 190 being actuated by relay LR-2 and switch 166 mechanically operated by a limit switch LS-2. A second coil 168 is connected in parallel with coil 164 and is energized simultaneously with coil 164 when switch 190 and limit switch 166 are closed. Coil 164 actuates an air cylinder 40 to cause the casting to be dropped into the satisfactory bin if it is good. Relay 168 is a time delay relay which, after timing out, closes switch 172 to energize means for causing a spot of paint to be applied to the castings. This paint device operating relay is shown at 170 and is connected in series across lines 154 and 156 with switch 172 operated by the timing relay coil 168.

The unlocking coil U of the locking relay LR-2 has one terminal connected to line 154 and the other through conductor 174 to a switch 176 which is a mechanically operated switch moved by limit switch LS-3, which like the others is actuated by movement of the conveyor. An electronic timer identified at 180 is directly connected across lines 154 and 156 and is adapted to be energized when switch 182 is closed. This switch 182 is actuated by locking relay LR-1 and is closed when that relay is energized. The purpose of the electronic timer is to separate good castings from bad when in some few instances the resonant frequency of an unsatisfactory casting remains the same as a good casting. It has been found that under certain circumstances, and mainly with relatively small cracks, some castings when struck will still resonate at the frequency of good castings, even though they contain a small crack. However, in one of these castings the waves die out very rapidly. The poor castings may therefore be separated from the satisfactory ones by the fact that the resonant frequency remains for only a very short time. For this purpose the electronic timer is inserted in the control system, and if the resonant frequency is not still present after a certain predetermined interval of time, the electronic timer opens the system and prevents the casting from being released as a good casting.

Just below the right-hand side of FIGURE 4 the sequence of operation of the limit switches and the valves is diagrammatically shown as a particular part proceeds along on the conveyer line. As the part approaches from the left-hand side, the carriage upon which it is mounted operates the limit switch LS-1 and energizes the coil 162 to ring the casting. As it passes along, it next engages switch LS-2, and if the casting is satisfactory, actuates release valve coil 164 to release the casting over the proper bin. Lastly, it engages limit switch LS-3 which unlocks latch relays LR-1 and LR-2 by energizing the unlocking coil U in each relay, making them ready for the next part to approach. If, of course, the part has not been released, since a satisfactory signal was not applied to the output of the discriminators, then a cam surface 50 engages one side of the carriage to release the part over the bad hopper.

From this general description the operation of the system will now be specifically described. As before mentioned, a part has its own natural resonance. The frequency may, of course, vary somewhat between parts and still be satisfactory. By using the two discriminator circuits above described, one discriminator can be adjusted so that its output is zero at a frequency which represents the lowest frequency which is acceptable. The second discriminator may then be adjusted so that its output is zero at the highest frequency which is acceptable. Anywhere between these two frequencies the switching arrangement shown will complete a circuit to operate the devices and release the casting as satisfactory, but any frequency either below the low frequency setting or above the high frequency setting will not provide a complete circuit and the casting will go on and be dropped in the poor casting bin.

Let it be assumed that discriminator #1 is set to the low frequency point and that it delivers positive voltage across the voltmeter 82 for frequencies above the low frequency value, and a negative voltage for frequencies below the set value. Higher frequencies would then cause the switch arm 88 to move to the right and engage stationary contact 92. In like manner discriminator #2 is adjusted to, for example, the high frequency limit, and again, any higher frequencies would cause its switch arm 142 to move to the right and any lower frequencies would cause it to move to the left, engaging stationary contact 138. Thus a circuit for locking coil L of the locking relay LR-2 may be completed through the following circuit for any frequencies between the upper and lower frequency limits. This circuit may be traced as follows: line 154, locking coil L of relay LR-2, switch contacts 147, which are actuated by relay LR-1, line 146, movable switch arm 88, contact 92, conductor 144, contact 138, meter arm 142, switch contacts 184, which are actuated by the electronic timer 180, to supply line 156. Thus at any frequency within the satisfactory range this circuit is completed by the meter relays which energizes relay LR-2. At any frequency of resonance either above or below this range, one or the other meter relay will open and this circuit will be incomplete, and therefore the part will not be released.

Assuming that a satisfactory part is mounted on a conveyer carriage and moving past the test locations, as the carriage approaches limit switch LS-1, it closes switch 160. This completes an obvious circuit through locking coil L of locking relay LR-1, and that relay is actuated and locked. This closes switch 182, energizing the electronic timer 180, and also closes switch 147, which completes the circuit just traced for locking coil L of locking relay LR-2, and that relay locks up. Simultaneously with the closure of LR-1, relay coil T is energized, which closes its switch T-1, thus completing a circuit to coil 162, which causes the striking solenoid to engage the part and ring it. The vibrations from the part are picked up by the transducer 36, amplified in the amplifying section 52, and applied to the two discriminators. Assuming that the frequency is within the allowable range, the circuit is completed through the two meter relays and coil L of LR-2 and relay LR-2 locks up. The energization of LR-2 closes switch contacts 190, conditioning coils 164 and 168 for energization when the part engages limit switch LS-2 to close switch 166, which will be at a location adjacent the hopper 42 into which it is desired to drop the good parts.

When the part has reached this location, relay coil 164 will be energized, causing energization of the air cylinder 40 to release the part, and energization of relay coil 168 simultaneously will cause its switch 172 to close, completing a circuit to the paint spray control relay 170 and a dot of color will be applied to the part, indicating that it is satisfactory. As the conveyer carriage moves on now without its part, it engages limit switch LS-3, which causes a closing of switch 176. This completes an obvious circuit to the unlocking coils U of both latch relays LR-1 and LR-2, which relays are now unlocked and placed in initial condition for the next part coming through.

If, as before mentioned, the part which is under test has a frequency within the proper range but has a very small crack therein, the resonant vibration will fade very rapidly. It is desired to point out that as soon as the part reaches the testing area, actuating switch LS-1 and energizing locking relay LR-1, the electronic timer is energized. Of course simultaneously with the energization of LR-1, the part is struck. If the resonant vibration falls rapidly so that there is no output in the discriminators after a certain time, the electronic timer will cause the opening of its switch 184. Then even though the frequency was within the right range, this will deenergize the whole system and the part will not be dropped in the satisfactory hopper but merely continue on until it reaches a station over the hopper 48 for poor castings, and be mechanically released.

FIGURE 5 discloses a modified discriminator section in which the meter relays are replaced by a different type of relay known as microposition relays. The specific system includes the same transformers 58 and 62 which are connected across the amplifier output lines 54 and 64 as before. The secondary winding 66 of the transformer 58 is connected to the anodes 72 and 70 of the rectifier tube 74. In this instance a series connection of a variable inductance 200 and a variable condenser 202 is applied across secondary 66 to tune the discriminator. The cathodes 78 and 84 are connected through lines 80 and 86 as in FIGURE 4, but in this instance extend to one terminal of an operating coil 204 and a second coil 206 respectively. These two operating coils sense the direction of flow of current and are connected together in series. When the current flows in one direction, the relay armature 208 will be tipped about its pivot to engage one of the stationary contacts 210 or 212, and when the current reverses, the relay armature will be tipped in the opposite direction. The armature 208 is directly connected to line 146. Stationary contact 210 is unconnected to any further circuitry and stationary contact 212 is connected through line 214 to a stationary contact 216 of the relay for the second discriminator. In the second discriminator the transformer secondary 104 has connected thereacross a similar series tuning circuit comprising variable inductance 218 and variable condenser 220. The rectifier tube 112 in this instance has its cathodes 114 and 116 connected through lines 118 and 120 to one terminal of operating coils 222 and 224 which, as in discriminator #1, are in series. The armature 226 of the relay in the second discriminator is connected to line 228, which extends to switch 184. Stationary contact 230 of this relay is unconnected.

The operation of these two discriminators as shown in FIGURE 5 is the same as those shown in FIGURE 1. When discriminator #1 is, for example, tuned to the frequency representing the low extreme of the desired range, any increase in frequency will cause the armature 208 to pivot about its center, engaging contact 212, and closing a circuit from line 146 to line 214. Tuning discriminator #2 to a frequency representing the high limit also will cause it to operate its armature 226 to engage contact 216 for any frequency below that, thus again completing a circuit from line 228 to line 214.

It is therefore obvious that we have devised a very useful testing system which will select satisfactory parts such as castings by determining their resonant frequency as falling within a predetermined range and lasting for a predetermined time.

We claim:

1. In testing apparatus having movable supporting means for carrying like parts to be sequentially tested past a plurality of stations and means for striking a part mounted at one station to cause the part to resonate, transducer means located at a station to change the vibrations of the part into electrical oscillations, a plurality of discriminator means connected in parallel to the transducer output and tuned to different center frequencies representing the upper and lower limits of an approved range of vibration frequencies for the part being tested, a first switching means connected to one discriminator means, a second switching means connected to another discriminator means, selective means, said selective means being connected in series circuit with said first and second switching means and controlled by the combined action of the two switching means to select parts being tested.

2. In testing apparatus having movable supporting means for carrying like parts to be sequentially tested past a plurality of stations and means for striking a part mounted at one station to cause the part to resonate, transducer means located at a station to change vibrations of the part into electrical oscillations, a plurality of discriminator means connected in parallel to the transducer output and tuned to different center frequencies representing the upper and lower limits of an approved range of vibration frequencies for the part being tested, a first switching means sensitive to voltage polarity connected to the output of one of the discriminator means and engaging contacts on opposite sides of a neutral position depending on the polarity of the output of the discriminator means, a second polarity sensitive switching means connected to the output of another of the discriminator means and engaging contacts on opposite sides of a neutral position, selective connected in series circuit with said first and second switching means so that when the first and second switching means are in predetermined positions simultaneously the selective means is energized to classify the part but when the switches are at any other position the selective means will not be energized.

3. In an automatic testing machine for testing the soundness of a plurality of like parts having a natural resonant frequency, continuously moving carriage means for supporting said parts for movement along a path, means for striking one of said parts located at a given point along the path, means connected thereto for controlling the same actuated by the arrival of the part at the given point, microphone transducer means mounted adjacent the part when it is struck to pick up the resonant vibrations thereof and convert them into elecrtical oscillations, selector means located at a distance from the striking position along the path of the carriage, operating means for the selector means connected to the microphone transducer and actuating the selector means dependent upon the output of the microphone transducer, relay switching means a portion of which includes lock in and reset means which must be positively energized respectively to close or open the associated switching means, said plurality of relay switching means being electrically connected to said means for controlling the striking means and to the operating means for the selector means, and a plurality of mechanical switching means mounted along the path of the parts and actuated by the arrival of the part being tested at different locations, said mechanical switching means being connected in circuit with the striking means, the selector means, and the reset means respectively to energize the striking means, place the selector means in condition for operation by the operating means and reset the relay means as the parts proceed.

4. In an automatic testing machine for testing the soundness of a plurality of like parts having a natural resonant frequency, continuously moving carriage means for supporting said parts for movement along a path, means for striking one of said parts located at a given point along the path, means connected thereto for controlling the same actuated by the arrival of the part at the given point, microphone transducer means mounted adjacent the part when it is struck to pick up the resonant vibrations thereof and convert them into electrical ocsillations, selector means located at a distance from the striking position along the path of the carriage, operating means for the selector means connected to the microphone transducer and actuating the selector means dependent upon the output of the microphone transducer, relay switching means a portion of which includes lock in and reset means which must be positively energized respectively to close or open the associated switching means, said plurality of relay switching means being electrically connected to said means for controlling the striking means and to the operating means for the selector means, a plurality of mechanical switching means mounted along the path of the parts and actuated by the arrival of the part being tested at different locations, said mechanical switching means being connected in circuit with the striking means, the selector means, and the reset means for the relay switching means, respectively, to energize the striking means, place the selector means in condition for operation by the operating means and reset the relay switching means to open position as the parts proceed and timing switching means connected in circuit with the relay switching means to open the circuit of the relay switching means at the end of a prescribed period of time if the output of the microphone transducer is not maintained.

5. In apparatus for testing the soundness of a plurality of identical parts having means to sequentially transport each part to be tested past a point where it is mechanically set into resonant vibration for testing and from said resonant vibration frequency tested, selecting means for identifying satisfactory parts including transducer means mounted adjacent the position of each vibrating part and subject to the vibrations thereof, a plurality of discriminator circuits connected in parallel to the transducer means and adjusted to different center frequencies representative of upper and lower frequency limits of a satisfactory range of vibrating frequency in the selection of sound parts, a switching means connected to the output of each discriminator circuit, said switching means being alternately open and closed above and below the center frequency for which its associated discriminator is set to provide a range of frequencies within which both switching means are closed, a source of electrical power and sorting means connected in series circuit with both switching means and the source of electrical power and energized to separate the satisfactory parts from the unsatisfactory parts when both the switching means are closed within a satisfactory frequency range.

6. In part testing apparatus in which a part is mechanically vibrated at a natural frequency to determine its soundness, transducer means mounted in juxtaposition to a part which is vibrating at its natural resonant frequency, said part being satisfactory if its vibrating frequency falls within a predetermined range of frequencies, a first discriminator circuit connected to the transducer and adjusted so that its center fequency corresponds to the frequency at one end of the frequency range of the part a second discriminator connected to the transducer in parallel to the first discriminator and adjusted so that its center frequency is adjusted to a frequency representative of the other end of the frequency range of the part, polarized switching means operative either side of the center frequency connected to the output of each first and second discriminator circuit and providing for common closure of both switching means in the range between the two center discriminator frequencies, a source of electric power, and sorting means connected in series with both switching means and a source of electrical power and energized when both switching means are closed but deenergized when either of the switching means open for the sorting of parts.

7. In apparatus for testing the soundness of a plurality of like parts by utilizing the natural resonant frequency of vibration, said parts having a known satisfactory range of resonant frequency vibration between an upper and a lower limit, a source of electric power, sorting means for determining the disposition of a part after testing, a plurality of switching means connected in series with each other and the source of electric power and sorting means so that the sorting means is not energized unless the plurality of switching means are closed, a first discriminator circuit adjusted so that its center frequency coincides with the upper limit of resonant frequency of the part being tested connected to one of the switching means to close the same if the frequency applied thereto is below its center frequency and open it at any frequency above its center frequency, a second discriminator circuit adjusted so that its center frequency is that of the lower limit of resonant frequency of the part being tested connected to the other of said switching means to close the same at any frequency above its center frequency and open it at any frequency below its center frequency and transducer means mounted near the part when it is resonating at its natural frequency and converting the mechanical vibration of the part into electric oscillations, said transducer being connected to both the first and second discriminators to apply the oscillations thereto to control the switching means.

References Cited in the file of this patent
UNITED STATES PATENTS

| | | |
|---|---|---|
| 2,112,621 | Henszey et al. | Mar. 29, 1938 |
| 2,208,202 | Stanton et al. | July 16, 1940 |
| 2,383,855 | Hansell | Aug. 28, 1945 |
| 2,403,999 | Read | July 16, 1946 |
| 2,423,229 | Crosby | July 1, 1947 |
| 2,457,730 | Roberts | Dec. 28, 1948 |
| 2,500,212 | Starr | Mar. 14, 1950 |
| 2,571,409 | Beyer et al. | Oct. 16, 1951 |
| 2,635,746 | Gordon | Apr. 21, 1953 |
| 2,651,673 | Fredendall | Sept. 8, 1953 |

UNITED STATES PATENT OFFICE

CERTIFICATE OF CORRECTION

Patent No. 3,029,943                      April 17, 1962

Milton J. Diamond et al.

It is hereby certified that error appears in the above numbered patent requiring correction and that the said Letters Patent should read as corrected below.

Column 7, line 37, for "neutral, position, selective connected" read -- neutral position, selective means connected --.

Signed and sealed this 24th day of July 1962.

(SEAL)
Attest:

ERNEST W. SWIDER
Attesting Officer

DAVID L. LADD
Commissioner of Patents